United States Patent [19]
Cicare

[11] Patent Number: 5,165,854
[45] Date of Patent: Nov. 24, 1992

[54] MECHANISM FOR CONTROLLING PITCH CHANGE IN HELICOPTER BLADES

[75] Inventor: Augusto U. Cicare, Buenos Aires, Argentina

[73] Assignee: Industrias Cicare S.R.L., Buenos Aires, Argentina

[21] Appl. No.: 726,867

[22] Filed: Jul. 8, 1991

[30] Foreign Application Priority Data

Jul. 12, 1990 [AR] Argentina .............................. 317-354

[51] Int. Cl.$^5$ .............................................. B63H 1/06
[52] U.S. Cl. .................................... 416/147; 416/114; 416/148; 416/168 R; 244/17.25
[58] Field of Search ............. 416/147, 114, 98, 168 R, 416/148; 244/17.25, 221, 220, 234, 232

[56] References Cited

U.S. PATENT DOCUMENTS 3,799,695 3/1974 Yamakawa ..................... 416/114 X

FOREIGN PATENT DOCUMENTS 1009222 5/1952 France ................................ 416/114
439165 9/1948 Italy ..................................... 416/148

Primary Examiner—Edward K. Look
Assistant Examiner—Todd Mattingly
Attorney, Agent, or Firm—Bachman & LaPointe

[57] ABSTRACT

Mechanism for controlling pitch changes in helicopter blades, related to the helicopter mast and connected to a lever assembly mounted into the structure, having a pair of command arms, the assembly comprising first and second bars, related by rocker arms, for selective transmission of cyclic and collective pitches.

14 Claims, 5 Drawing Sheets

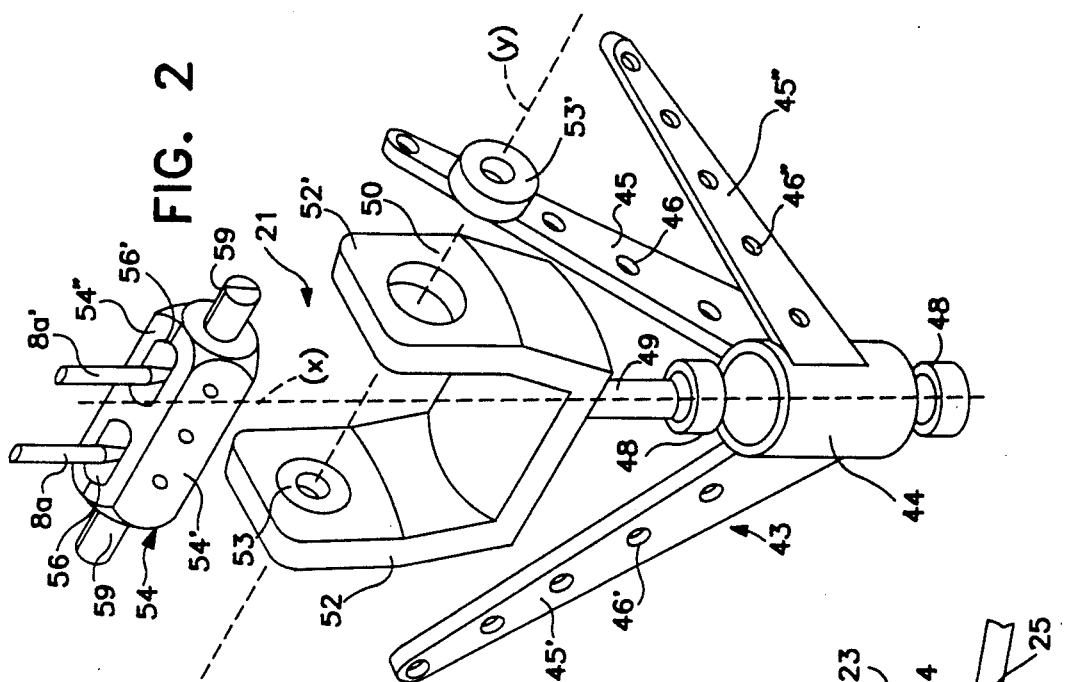
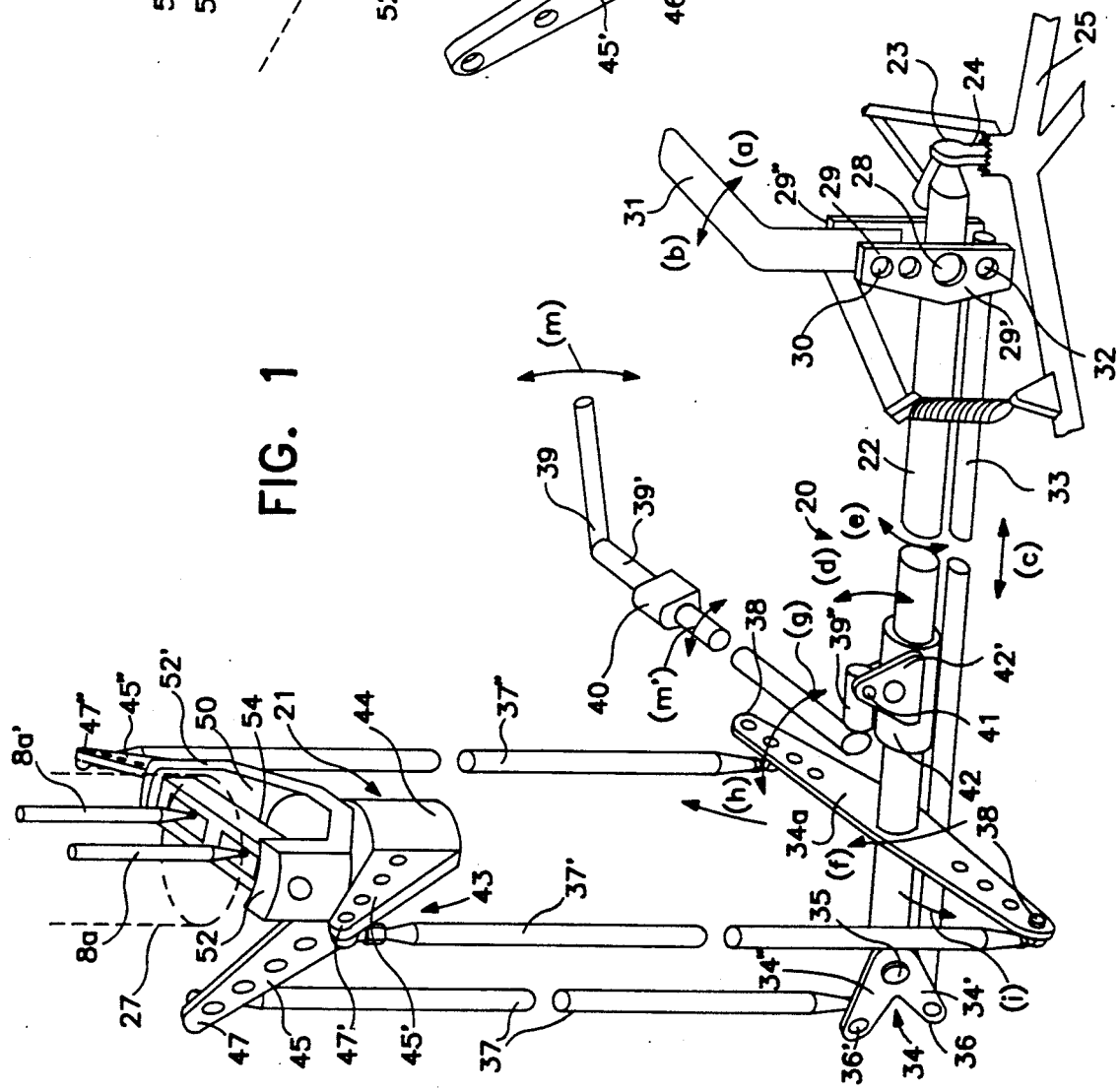

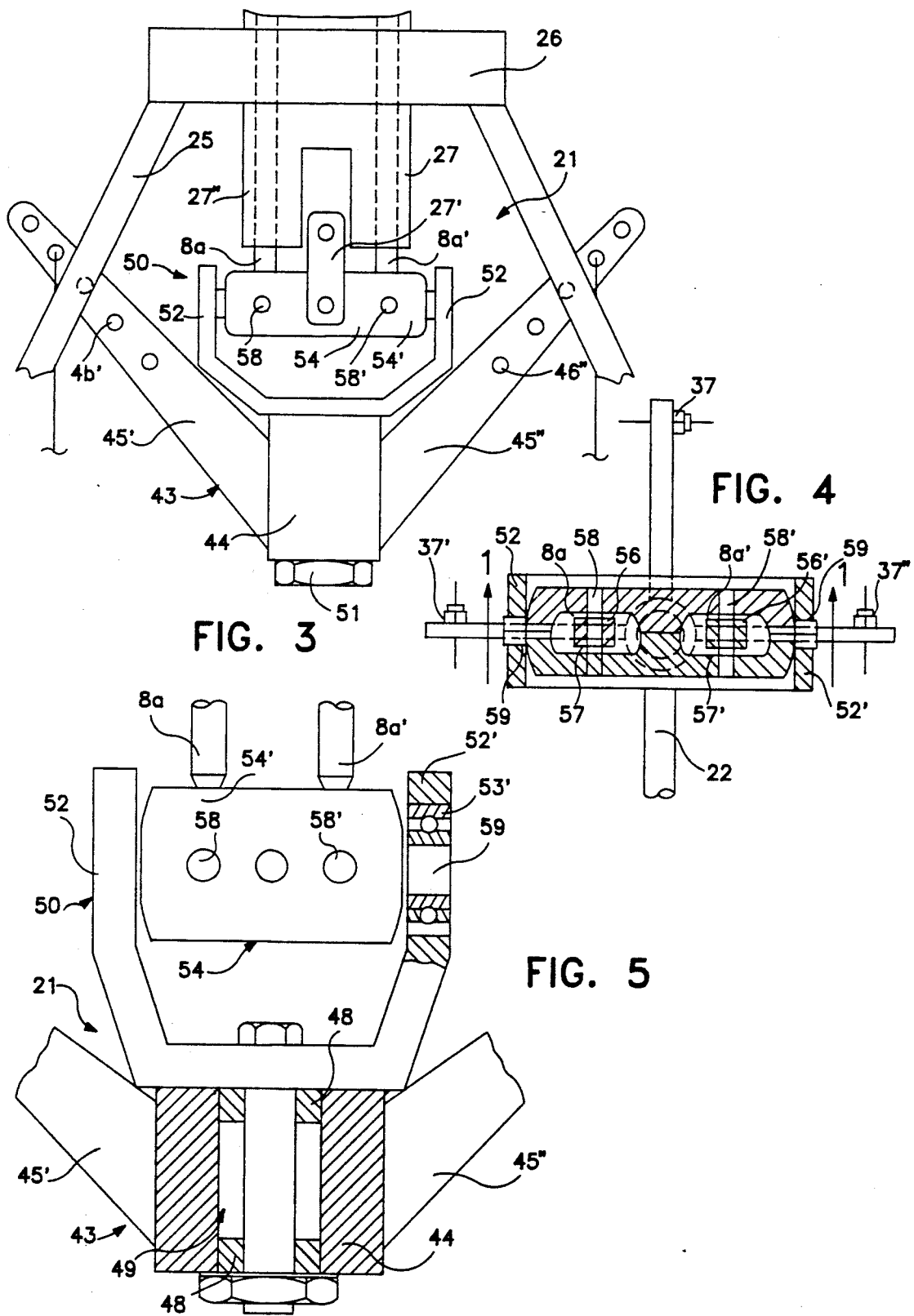

MECHANISM FOR CONTROLLING PITCH CHANGE IN HELICOPTER BLADES

FIELD OF THE INVENTION

The instant invention relates to a control mechanism for helicopter rotor blades, particularly to a novel manual command mechanism of the blades pitch for producing helicopter movements in the desired direction.

BACKGROUND OF THE INVENTION-PRIOR ART

The object of the invention is a mechanism of simple construction and maintenance attaining the higher efficiency without any risk of impairing safety during flight, with the command of operations related to the directional control, i.e., control of the cyclic pitch and collector or collective pitch in order to generate the desired movements in the helicopter.

Mechanisms of the mentioned kind are already known in the art, allowing the manual control of the blades from the cabin in order that the helicopter may change its direction, and the constitutive and structural features of which cause disturbing effects on the vehicle stability due to the size or dimension of the components or due to the effect of undesired forces tending to incline the apparatus or to produce undesirable oscillations.

The command mechanism of helicopters is one of the most complex parts thereof as it should accomplish a complex function since the flight of this type of machines is different from that of conventional airplanes. In fact, helicopters are supported by means of the movement of a rotor the blades of which are manually controlled from the cabin.

Vertical support is created by a combination of the rotor revolution increase and the blades pitch.

The displacement or change of direction is obtained by inclination of the complete rotational circular plane formed by the rotor blades during their rotation, this allowing the helicopter to fly forwardly, rearwardly or towards the sides.

For a better understanding of the movement created as a consequence of the angle of attack of the blades, it is to be noted that the blades are related to the rotor mast, such that they may move vertically without affecting the mast, i.e. they have a movement known as fluttering. Apart from this type of fluttering hinge, they have a strong or resistant hinge, allowing slight movement of the blades forwardly and rearwardly, at the base height (root height), place on which they are hinged to the mast, thus avoiding fatigue cracks.

This kind of articulated rotor whose blades, individually or jointly may flutter, resist forward movement or rout, is commanded by a universal mechanism in helicopters called "circular ring" or "oscillating plate", which transmits command movements for producing cyclic or collective pitch variation to the blades.

Upon operating the cyclic pitch command, known as "lever", which is in front of the pilot into the cabin, the displacement of the helicopter is controlled as per its longitudinal or transversal axes and, when the pitch or collective command at the left of the pilotis actuated, displacement of the helicopter is controlled through its vertical axis.

An appropriate combination of both commands, i.e. of the cyclic and collective pitches with the force caused by the anti-torque rotor, enables the whole control of an helicopter.

As already mentioned, the universal mechanism allowing the control or transmission of the pitch to the blades is known as "oscillating plate", which although efficient for its specific function, has certain disadvantages due to the size of its parts and of the effects resulting from such size since, as known, any rotatory mass produces a gyroscopic effect when trying to make its rotation in a plane different from the common rotational plane, as happens when a force is created at a determined point of the rotational plane by means of linkages when acting the corresponding commands.

The mechanism called "oscillating plate", as may be seen in FIGS. 13-14 comprises a hub (1) acting as a jaw fixed to the mast (2) to which mast (4) blades (3) are hinged, by means of flexing portions (5), in order to effect a semi-rigid movement around its flapping axis (a). The blades (3) are connected to corresponding rocker arms (6) connected to the base of blades (3) to allow the smooth rotation thereof around pitch change spindles (7).

Rocker arms (6) are pivotally interconnected by means of connecting rods (8) to an oscillating plate (9), comprising a rotatory portion (9a) and to a fixed portion (9b) connected by means of rods (10) to the cyclic command lever (11).

In turn, the fixed portion (9) is related to means transmitting, when the collective pitch command (12) is activated, a movement which is added to the movement of the cyclic pitch command, raising or lowering the oscillating plate (9).

In fact, the cyclic pitch mechanism (11) has arms (13) for transmitting a force which causes longitudinal inclination of the oscillating plate (9) and an arm (14) for causing side inclination of the latter engaged to a command arm (15).

This type of conventional command, applied to what is known as articulated rotor, when the cyclic control command (11) is actuated from the cabin, allows that the oscillating lever (9a), to which they are connected by means of strips (8') and blades (3) by means of linkages, moves or inclines in the desired way. Blades (3) will also follow the inclination of the oscillating plate (9a), fluttering until obtaining a position inclining the rotative disk such that the desired movement is obtained.

The operation of the collective pitch command (12) increases or diminishes the pitch of blades (3), regardless of the position thereof on the rotatory or sweep disk since the oscillating plate (9) will raise or lower on the rotational axis and displacing the connecting rods (8), connected to the blades (3) in an identical way, thus maintaining them parallel to the rotational axis of the mast (4).

The mechanism disclosed and schematically represented in FIGS. 13 and 14 is exterior and concentrical to the shaft transmitting the toroidal power to the wings of the main rotor and, therefore, the use of great diameter bearings is required. Further, the pivotating spherical body of the oscillating plate is of large size in order to allow the passage of the shaft through its center.

In these mechanisms, the need of using selflubricated mechanisms and a spherical body as pivot for the movable part, increases the friction of the command mechanism.

The size of the mechanism called "oscillating plate", presents a rotatory mass producing gyroscopic effects when rotating in a different plane. In fact, control rods transmitting movements of the control levers in the cabin, actuate the blades up to a point 90 degrees forward the place in which the desired displacement will take place due to the gyroscopic movement.

Blades, when operating quickly, act as a gyroscope and offer a resistance at a point located 90 degrees towards the rotational direction in which a torque or force is applied. In this way, when the cyclic control moves, this movement will be transmitted by means of linkages to the rotors, and a force at a determined point of the rotational plane is created, with respect to the point in which the force is applied.

This gyroscopic effect is noted at the commands, disturbing the stability of the helicopter and, therefore, an additional effort at the commands is required. In order to overcome this disadvantage, servocommand (16) or friction damper (17) systems are used, FIG. 15, in order to restrict movement of the blades and maintain the center of gravity without any variation, in order not to produce excessive vibration affecting the helicopter buoyancy during flight.

In most helicopters, a stabilizing bar is also employed in order to prevent instability, this bar rotating exactly below the articulated rotors and, acting as a gyroscope maintaining the rotational axis, thus avoiding oscillations disturbing the machine.

The conventional command mechanism called "oscilating plate", as may be seen, has certain disadvantages, although it fulfills the specific object, but the cited disadvantages leading to disturbances in the helicopter stability, have caused the use of friction dampers or stabilizing bars in order to avoid excessive vibration due to possible changes in the center of gravity of the system.

Therefore, designers are very much concerned about the asymmetrical buoyancy problem obtained by the use of a proper positioning of the attack angle of the blades which, at present, is obtained by means of said mechanism which, due to its size, requires additional efforts at the commands to counteract the mentioned effects.

SUMMARY OF THE INVENTION

The present invention relates to a mechanism of easy construction overcoming in a great extent the disadvantages above cited since it has no oscillating plate, the mass of which is one of the main causes of the problem.

In accordance with the invention, the mechanism may be applied to any kind of helicopter, whether of small or large span and cyclic and collective pitches are transmitted by a minimum assembly of parts replacing the oscillating plate, and which is on one side engaged by means of two connecting rods to the blades and on the other by means of three connecting rods to a pair of levers, forming the manual command system into the cabin and permitting steering of the helicopter.

The three connecting rods transmit the cyclic pitch as well as the collective pitch since they are articulated through corresponding ends to the arms of a spider-shaped part having a tubular nucleus on which it is mounted, in a freely rotatory way, the pin of a bearing yoke on two small bearings.

The yoke has, in turn, a pair of parallel arms, each of which include a bearing determining an articulation axis of a part or cross member comprising two cavities for corresponding bearings forming linkage points of the ends of the pair of connecting rods engaging respectively to each of the blades and which are always maintained parallel to the rotor axis during pitch transmission and are those determining the cyclic as well as the collective pitch.

The yoke rotates along with the rotor mast and its relation with the spider-shaped part allows said yoke to copy exactly the angle and the height adopted by the spider in response to the command levers.

The three connecting rods transmitting the cyclic pitch as well as the collective pitch, and which are linked to the arms of the spider-shaped part, are linked or articulated by their lower ends to the end of a bar having one end with support linked to the opposed end, and to opposed ends of a cross member or rocker arm fixed to said bar at an intermediate point thereof. Further, the bar is related to pitch such that, the latter may move the connecting rods vertically to transmit collective pitch to the blades.

The bar, in turn, is connected at its end articulation portion to a command arm permitting the cyclic pitch of the blades, which is fixed to a rocker arm linked to the bar and to a second bar which at its end is linked to an arm of a third rocker arm for acting one of the three connecting rods joined to the spider. The command of this arm corresponding to the "lever" allows selective displacement of each of the connecting rods, the yoke copying the angle adopted by the spider.

Consequently, the blade pitch is determined in both systems (oscillating plate and that of the instant invention) by means of the vertical displacement of the connecting rods associated to the blades modifying the vertical position of the supporting points of the rods.

It should be taken into account that the straight line joining in a two-blade helicopter the supporting points of the connecting rods, articulating the blades, form a plane when blades rotate and, therefore, the angle formed by said plane with a plane perpendicular to the mast corresponding to the main rotor and the vertical distance with respect to a zero level, will allow defining at any moment the vertical position of the connecting rods linked in the blades.

The mechanism of the invention is novel in this sense, since the inclination and the vertical position of the reference plane is obtained in a different way. In fact, this plane is conventionally defined with respect to its angle by means of two connecting rods acted by the cyclic pitch lever and a pivoting point of the oscillating plate and, with respect to its vertical position, raising and lowering said pivoting point by means of another connecting rod from the collective pitch.

Summarizing, the use of an oscillating plate is required, mounted on a displaceable support at the vertical axis of the rotor. Therefore, the oscillating plate should be exterior to the shaft transmitting power to the main rotor in order that the oscillating plate may pivot over its center.

The mechanism of the instant invention is defined to said plane by means of three connecting rods without pivoting points which permits eliminating the oscillating plate which, in all helicopters, requires the use of large diameter bearings in order to overcome the shaft diameter, in this way creating mechanisms of great dimensions.

As stated above, due to the required size of the known mechanisms, their rotatory mass produces gyroscopic effects when rotating on a different plane, and the consequences are observed in the commands, disturbing the stability of the apparatus.

This problem requires the use of mechanical friction dampers and the use of stabilizing bars for avoiding impairing the stability of the apparatus during flight.

The mechanism proposed by the invention, on the other hand, is of small dimensions thus making almost unnoticeable the gyroscopic effect, using in consequence direct commands and making unnecessary the use of stabilizing means, without additional efforts in commands. This feature makes it appropriate for small helicopters, which cannot be attained with the conventional mechanism due to its size.

The manufacturing cost is very much lower than that of conventional mechanisms since it employs very few parts, and due to its novel system for controlling the collective and cylic pitch, the helicopter is highly stable when effecting any kind of maneuver during flight.

Therefore, the instant invention relates to a mechanism for controlling the pitch change in helicopter blades, particularly to a mechanism for the manual command of small and large span helicopters, of the type comprising a main rotor having at least a pair of blades mounted at the end of a mast for rotating around the rotational axis of the mast rotatorily supported by the helicopter structure, said blades being engaged by corresponding flapping flexural portions to a hub mounted on said mast, said portions defining a cyclic pitch change axis, perpendicular to the rotational axis of the mast, said blades being connected to pitch rocker arms linked to the ends of corresponding connecting rods for transmitting cyclic and collective pitch commanded by a mechanism positioning thereof, related to said mast, and connected to a lever assembly mounted at the interior of the structure, including a pair of command arms for said pitches, cyclic and collective, located into the helicopter cabin and commonly called lever and pitch, wherein that said lever assembly comprises a pair of first and second bars, parallel and spaced therebetween, the first of which is arranged in an articulated and cantilever form with respect to a support fixed to the helicopter structure, said bars, adjacent said support, being related by a first rocker arm linked to the cantilever bar and engaged to the cyclic pitch command arm, the cantilever bar being coaxially arranged with respect to an articulated bush to a third bar, transversal to said pair of bars, supported on fixed points of the structure and connected to the collective pitch command arm, the free ends of the pair of bars being connected by a second rocker arm, linked to the cantilever bar, the latter having a cross member at its intermediate point, as a third rocker arm, at the ends of the latter and at the second rocker arm there being corresponding connecting rods positioned vertically for selectively transmitting said pitches to said mechanism positioning the blades, constituted by a part for transmitting both pitches, having articulation points for said connecting rods, and by a yoke, mounted rotatorily on said part, transmitting cyclic pitch, capable of being angularly and axially positioned by said part with respect to the rotational axis of the mast, the yoke being provided with an articulated part, transversal to said mast rotational axis, comprising articulation means for a pair of connecting rods parallel to said rotational axis and located inside a tube constituting the mast linked to a pin transversal to said yoke part, the pair of connecting rods being engaged to said rocker arms positioning the rotor blades.

The invention also embraces accessory objects which will be evident on the basis of the following detailed description of an exemplary embodiment thereof, taken in connection with the accompanying drawings.

BRIEF DESCRIPTION OF THE DRAWINGS

FIG. 1 is a perspective view of the main components of the mechanism for manual command of the blade pitch of a helicopter, in accordance with the invention.

FIG. 2 is a perspective exploded view of the parts assembly of the mechanism of the invention for modifying the supporting points of the connecting rods for angular positioning of the blades.

FIG. 3 is an elevational view of the assembly of FIG. 2 duly related to the helicopter structure.

FIG. 4 is a plan view of said assembly, partially in cross section, for determining the positioning of the bearings for linking the connecting rods engaged to the blades and of the part or cross member for articulating said connecting rods.

FIG. 5 is a cross section through line 1—1 of FIG. 4.

In all figures the same reference numerals or letters designate the same or corresponding parts.

DETAILED DESCRIPTION OF THE INVENTION

With particular reference to FIGS. 1 to 12, the mechanism for manual command of blade pitch of a helicopter comprises basically a manual operation lever assembly (20), and an assembly (21) positioning the supporting points for connecting rods (8a-8'a) driving blades (3a).

Figure 13:
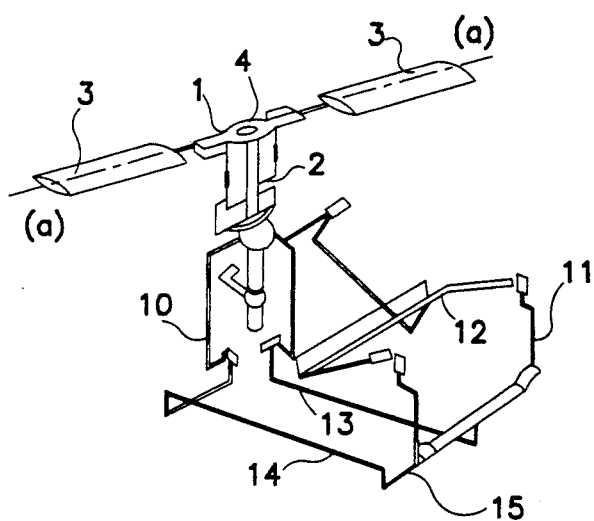
FIG. 13 is a schematic view of a conventional mechanism for determining cyclic and collective pitches, called "oscillating plate".
Figure 14:
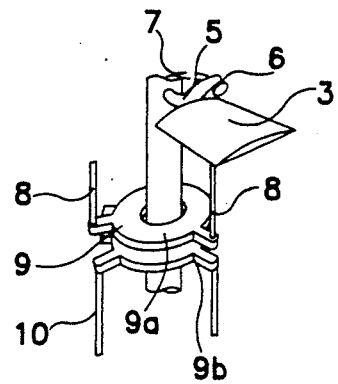
FIG. 14 is a detail of the positions adopted by the oscillating plate to establish cyclic pitch in the blades.
Figure 15:
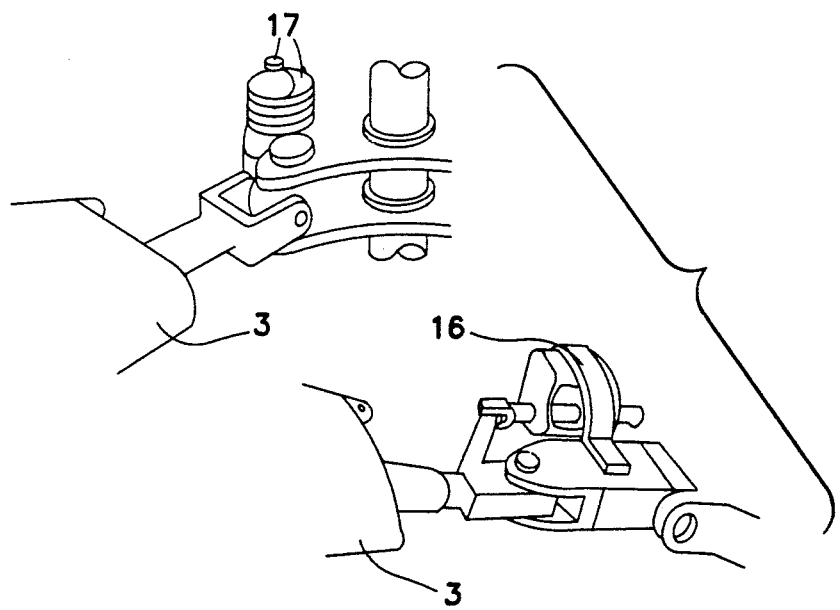
FIG. 15 is a detail of helicopter blades incorporating mechanical friction dampers or servo-commands for restricting the movement of those complementing the use of the oscillating plate.

These assemblies (20-21) establish cyclic and collective pitches, such as in the case of the "oscillating plate mechanism" described in connection with FIGS. 13 and 14, the disadvantages of which have been already stated hereinabove.

Figure 6:
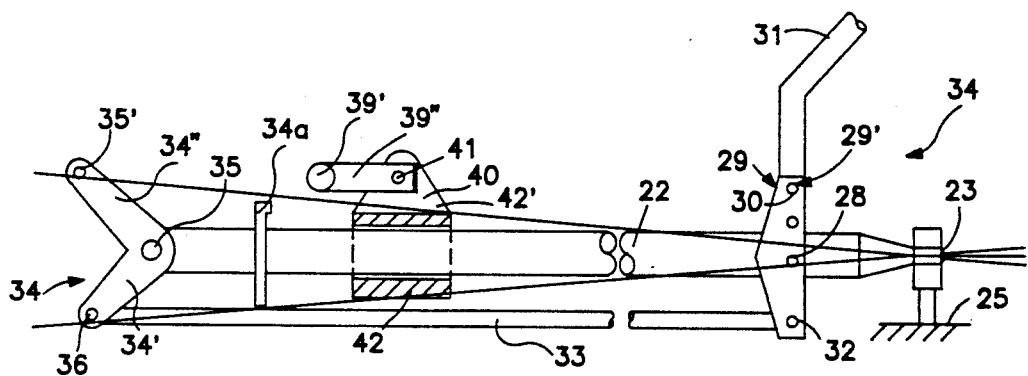
FIG. 6 is a side schematic view of the assembly of manual operation levers located inside the cabin for positioning the connecting rod command assembly.
Figure 7:
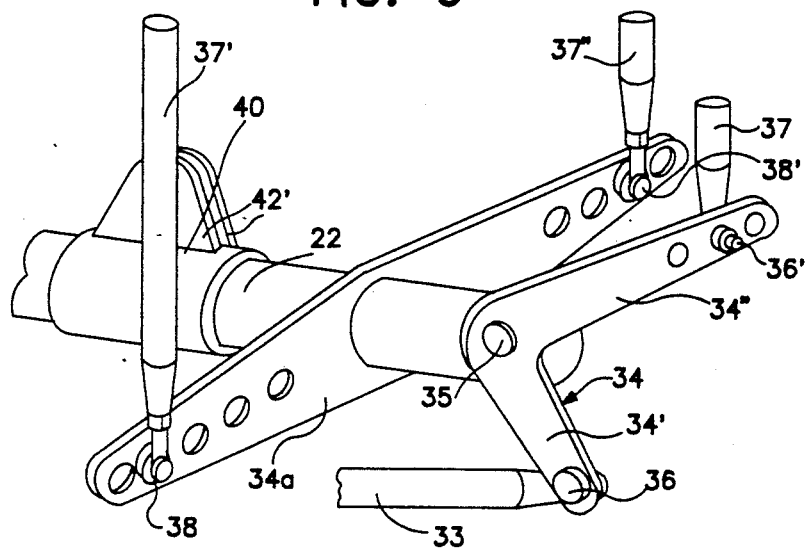
FIG. 7 is an enlarged view of the lever assembly of FIG. 6.
Figure 8:
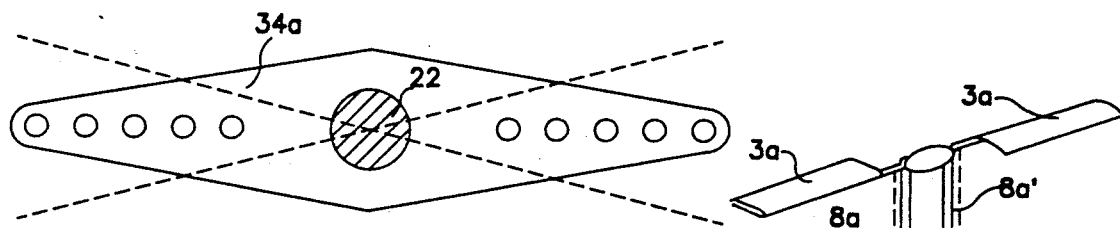
FIG. 8 is a front view of the lever assembly showing the movement of one of the rocker arms, in phanthom, for articulating and stressing two connecting rods.
Figure 9:
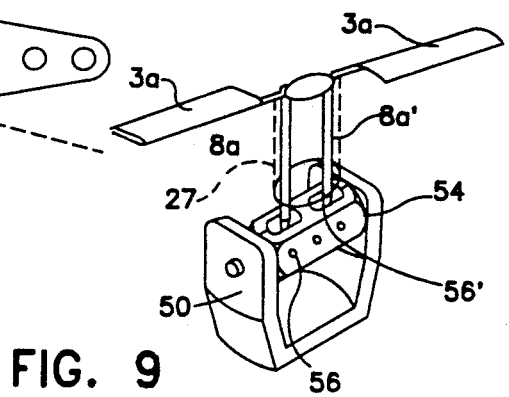
FIG. 9 is a perspective view of the joint between the cross member of the assembly for tr·asmitting pitch to the blades and the blades.
Figure 12:
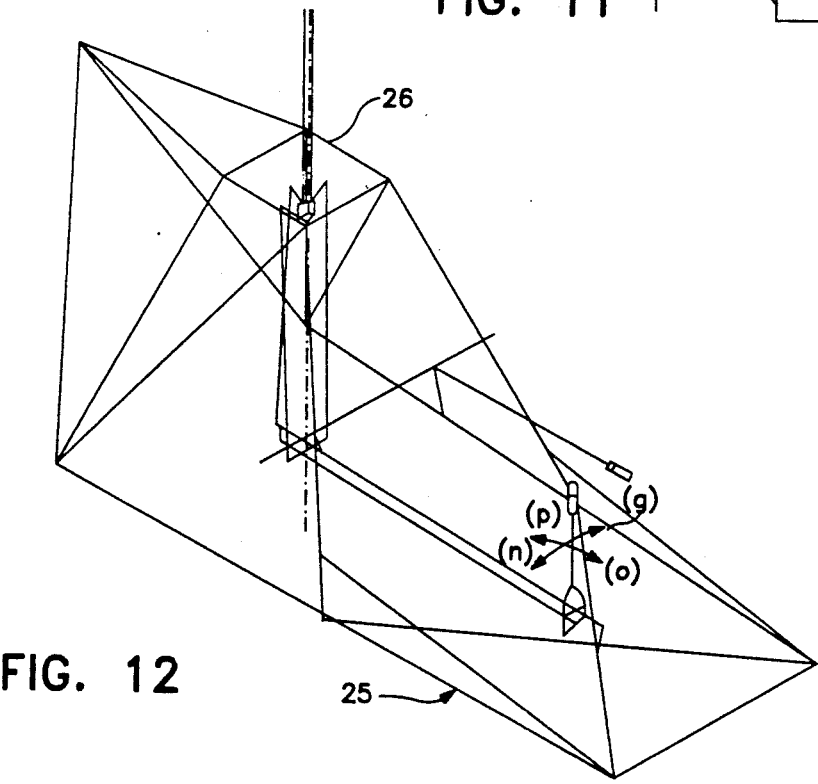
FIG. 12 is a general schematic view of the mechanism of the instant invention enclosed into a helicopter structure, for understanding the different movements of the components.

The lever assembly (20), as may be seen in FIGS. 1 and 6, comprises a main cantilever bar (22), having an end pin (23) for being linked to a support (24) which is an integral part of the tubular structure or frame (25), the general shape of which may be seen in FIG. 12.

The structure (25) comprises, at its upper part, a profiled platform (26) on which at tubular mast (27) is mounted, the blades (3a) being mounted at the upper free end thereof (see FIG. 3), and the lower end thereof is engaged in an articulated way to said assembly (21) positioning blades (3a) by means of small plates (27') into grooves (27").

At the end portion of cantilever bar (22) and, spaced from the support (24), a pin is linked (28), transversal to the bar (22), a first rocker arm (29) formed by a pair of small plates (29'-29"), engaged to the pin (28) on opposite sides of the bar (22). Plates (29'-29") are, in turn, engaged by corresponding ends by means of fixing members (30) to an arm (31) commanding the lever assembly (20) constituting, as will be seen, the so-called cyclic command "lever" positioned in front of the pilot.

The opposed ends of plates (29'-29") are linked to a pin (32) hauling a second bar (33), extending parallel to bar (22), both bars (22-33) being related by their free ends to a second rocker arm (34), constituted by a bent small plate having an articulation axis (35), connected to the first bar (22), and its branches (34'-34") being linked respectively, by means of pins (36-36') to the second bar (33) and to the lower end of a vertical connecting rod (37).

The bar (22) comprises, adjacent the second rocker arm (34), a third rocker arm (34a), connected to said bar (22), constituted by a traverse small plate at the free ends of which are linked in corresponding pins (38-38') the lower ends of respective connecting rods (37'-37"), which along with the end connecting rod (37) constitute the positioning means of the positioning assembly (21).

Lastly, the lever assembly (20) comprises a second command arm (39), corresponding to the pitch (collective), which is commonly located at the left of the pilot. This arm (39) has a segment (39') transversal to bars (22-33) and links at fixed points (40) of the structure (25), the segment (39') of the arm (39) having at an intermediate point, a lever arm (39") linked by a shaft (41), which links it to tabs (42') of a bush (42) coaxial to the bar (22).

Connecting rods (37-37'-37"), as indicated, transmit movements of the arms (31-39) to the positioning assembly (21) of connecting rods (8a-8a') driving the blades (3a) to establish cyclic and collective pitches thereof.

Based on the structural relationship of the components of the assembly (20) that the first rocker arm (29) may articulate on the pin (28) fixed to the bar (22) when the arm (31) of the cyclic pitch command is displaced as per arrows (a) and (b). This forward or rear movement allows displacement of the bar (33) as per arrow (c) causing the selective linkage (articulation) of the second rocker arm (34) around the pin (35).

Further, the side displacement of the arm (31) allows pivoting of the bar (22) on its axis as per arrows (d) and (e) causing movement of the third rocker arm (34a) as per arrows (f) and (g). The whole assembly (20) may be articulated upwardly and downwardly as per arrows (h) and (i) moving the arm (39) corresponding to the pitch.

The assembly (21) is formed by a spider-shaped part (43) comprising a tubular nucleus (44) from which three laminar arms (45-45'-45") project, two of which (45'-45") are contained at a mean plane of nucleus (44) and the remaining one (45) is situated at a plane perpendicular to said mean plane. I.e., arms (45-45'-45") are 90 degrees apart.

Arms (45-45'-45") have hole rows (46-46'-46") for positioning corresponding pins (47-47'-47") linking the upper ends of the connecting rods (37-37'-37"). It is to be noted that arms (45'-45") are co-planar to the third rocker arm (34a).

The spider-shaped part (43) comprises a pair of bearings (48) connected at opposed ends of the nucleus (44) for allowing rotation of a shaft (49) of a yoke (50) fixed to the nucleus (44) at the end of its shaft (4a) by means of fixation members (51), the shaft (49) of the yoke (50) being coaxially arranged in respect of the rotational axis (x) of the rotor (4).

The yoke (50) comprises a pair of arms (52-52')' in which corresponding bearings (53-53') are interlocked, determining an axis (y) transversal to axis (x) rotating the mast (4), for balancing a part or cross member (54) the opposite ends of which have corresponding journals (55-55') rotatorily seating on bearings (53-53').

The part or cross member (54) is constituted by two portions (54'-54") having the same shape, having corresponding pairs of cavities (56-56') faced to each other, and is complemented in order to form housings for corresponding bearings (57-57') at the place in which the lower ends of the pair of connecting rods (8a, 8a') are linked, around linkage pins (58-58'). Connecting rods (8a-8a') are placed, as already stated, engaged to rocker arms (6a) connected to blades (3a) in order to cause their movement in respect to the flexural portions (5a), in response to a pitch change.

Connecting rods (8a-8a') are inside the mast (27) and parallel to the rotational axis (x) of the mast (27). The tubular mast (27) is interiorly linked to the part or cross member (54) by means of a pin (59) passing through both parts (54'-54") thereof, the tubular mast (27) projecting through the profiled platform (26) of the structure (25) which has means (not shown) for allowing the free rotation of the tubular mast (27).

The invention will now be described in connection with its function, taking into account FIGS. 10, 11 and 12.

Figure 11:
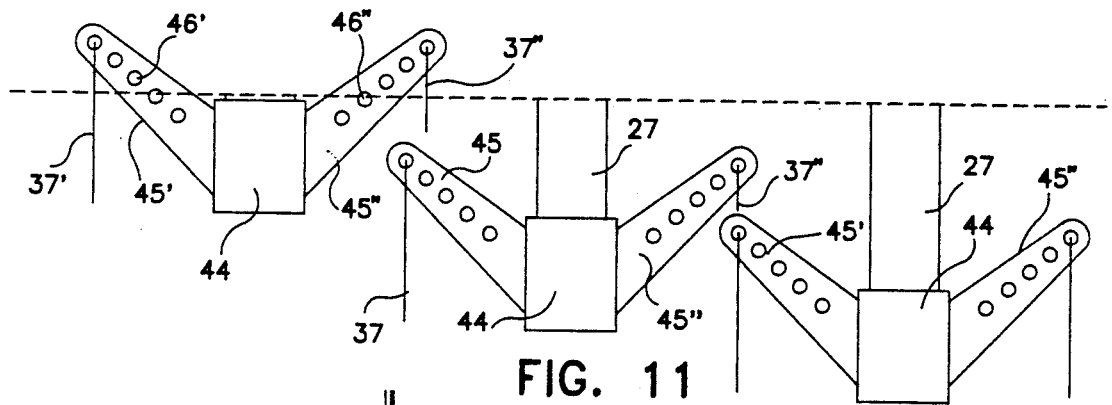
FIG. 11 is a schematic view of the different positions of the pitch transmission assembly for causing the collective pitch.

For the collective pitch command, FIG. 11, the pilot should actuate the command arm (39) (pitch) in the direction of arrow (m), moving the cross bar (39') which forms an integral part thereof, on the fixed point (40) in the direction of arrow (m'), causing the angular displacement of the lever arm (39"), linked by the shaft (41) to the bush (42). This causes the articulation of bar (22) on the support (24) raising (FIG. 11a) the rocker arms (34) and (34a) and, consequently, the bearing points or linkages of the lower ends of connecting rods (37-37'-37"), which being at their upper ends engaged to arms (45-45'-45") of the spider-shaped part (43) change the vertical position of the latter.

Since the spider part (43) is engaged to the cross member (54) by means of yoke (50), the vertical displacement of the spider part (43) will be copied by the cross member (54) and, therefore, the connecting rods (8a-8a') will have an ascending movement, parallel to rotational axis (x) of the mast (27).

When actuating the command arm (39) in the direction of arrow (n), i.e., oppositely to the way already described, an opposite effect is produced, such that connecting rods (8a-8a') will lower thus changing the rotational plane of blades (3) (FIG. 11).

For the cyclic pitch command, the pilot should actuate the arm (32), commonly called "lever", which has a series of movements due to its linkages.

In fact, if arm (32) is moved in the direction of arrow (o) it causes articulation of the first rocker arm (29) around the pin (28) and, therefore, the pin (32) hauls bar (33). This movement of the bar (33) causes articulation of the second rocker arm (34) around pin (35) of the bar (22), such that the branch (34") thereof displaces angularly raising the connecting rod (37) thus modifying the position of the spider part (43) (FIG. 10) and consequently, the rotational plane of yoke (50).

Since connecting rods (8a–8a') are engaged to the yoke (50) by means of the cross member (54) they will adopt a cyclic ascending and descending movement parallel to the rotational axis (x) of the tubular mast (27) and with respect to the plane formed by the spider part (43).

Figure 10:
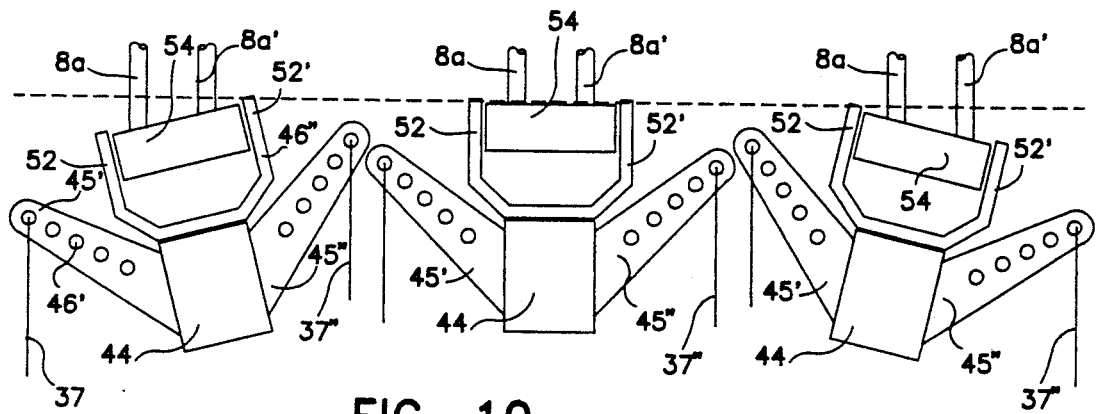
FIG. 10 is a schematic representation of the different positions of the assembly transmitting the pitch to the blades for determining the cyclic pitch.

The displacement of arm (32) in the direction of arrow (p) will produce an effect opposite to the former one, which may be easily understood on the basis of FIGS. 12 and 10.

If arm (32) is displaced in the direction of the arrow corresponding to the first rocker arm (29), it causes rotation of bar (22) in the direction of arrow (q) and, therefore, inclination of the third rocker arm (34a) such that connecting rod (37") lowers and connecting rod (37') raises, connecting rod (37) remaining at its position (FIG. 10). This movement will modify the position of part (43) causing a new rotational plane of yoke (50) and, therefore, of part (54) engaged to connecting rods (8a–8a').

Displacement of arm (32) in the direction of arrow (n), opposite to displacement already explained, produces an opposite effect.

From the above, it may be noted that combined movements of arms (32) and (39), commonly called "lever" and "pitch", may obtain the cyclic and collective desired pitches for all steering functions of the helicopter.

On the basis of the above detailed description, modifications and/or alternatives will become apparent for those skilled in the art, without departing from the scope of the invention which is only limited by the spirit of the appended claims.

I claim:

1. Mechanism for controlling pitch changes in helicopter blades, particularly for the manual command of small or large span helicopters, of the type comprising a main rotor having at least a pair of blades mounted at the end of a command mast for rotating around the rotational axis of the latter, rotatorily supported on the helicopter structure, said blades being engaged by corresponding flapping flexural portions to a hub mounted to said mast, said portions defining an axis for changing the cyclic pitch, perpendicular to the rotational axis of the mast, said blades being connected to pitch rocker arms linked to the ends of corresponding connecting rods transmitting cyclic and collective pitch commanded by a mechanism positioning thereof, related to said mast, and connected to a lever assembly mounted at the interior of the structure, including a pair of command arms for said pitches, cyclic and collective, located into the helicopter cabin, wherein said lever assembly comprises a pair of first and second bars, parallel and spaced apart, the first of which is arranged in articulated form and is a cantilever bar with respect of a fixed support of the helicopter structure, said bars being, adjacent said support, related by a first articulated rocker arm to the cantilever bar and engaged to the cyclic pitch command arm, the cantilever bar being coaxially arranged with respect to a bush linked to a third bar, transversal to said pair of bars, supported on fixed points of the structure and connected to the collective pitch command arm, the free ends of the pair of bars being connected by a second rocker arm, linked to the cantilever bar, the latter having a cross member at an intermediate point, acting as a third rocker arm, at the ends of the latter and at the second rocker arm, there being corresponding connecting rods vertically arranged for selectively transmitting said pitches to said blade positioning mechanism, constituted by a transmission part for both pitches, having articulation points for said connecting rods and a yoke mounted rotatorily on said piece, transmitting the cyclic pitch, capable of being positioned angularly and axially by said part, with respect to the mast rotational axis, the yoke being provided with an articulated part, transversal to said mast rotational axis, comprising means for linking a pair of connecting rods parallel said rotational axis and arranged in the interior of a tube constituting the mast linked through a traverse pin to said yoke, the pair of connecting rods being thus connected to said rocker arms for positioning the rotor blades.

2. A mechanism as claimed in claim 1, wherein said first rocker arm is comprised by a pair of small plates arranged on opposite sides of the cantilever bar, said plates being fixed at an intermediate point to an linking pin transversal to the cantialever bar, and linked at the bottom, by means of a second pin, to the bar parallel to the latter bar, the upper ends of the plates being fixedly connected to the cyclic pitch command arm.

3. A mechanism as claimed in claim 1, wherein said second rocker arm is comprised by a bent part, the branches of which are linked, respectively, to one of the connecting rods driving the blade positioning assembly and to the second bar, the mean point of said bent part being linked to a pin transversal to the first bar.

4. A mechanism as claimed in claim 1, wherein said thrid rocker arm is constituted by a profiled cross member located between the second rocker arm and said bush connecting the collective pitch command arm.

5. A mechanism as claimed in claim 4, wherein said third bar is linked to the bush by means of a small arm projecting perpendicularly from an intermediate point thereof, and the free end of which is crossed by a linking pin fixed to a pair of tabs forming part of the bush, the diameter of which is slightly higher than that corresponding to the first bar for allowing a longitudinal displacement of the latter and the vertical displacement of the pair of bars in response to the action of the collective pitch command arm.

6. A mechanism as claimed in claim 1, wherein said part transmitting both pitches of the blade positioning mechanism is a spider-shaped part having three laminar arms projecting from said tubular nucleus, of vertical axis, in a divergent way and beyond the upper end of the nucleus, said arms being angularly spaced at an angle of 90 degrees and provided with corresponding hole rows for obtaining articulated engagement of said second and third connecting rods, two of said arms being coplanar and mating with the ends of the third rocker arm and the third arm with one of the branches of the second rocker arm.

7. A mechanism as claimed in claim 6, wherein said tubular nucleus of said spider-shaped part, acts as a bush for a journal of said yoke arranged with free rotatory support between a pair of end bearings of the nucleus.

8. A mechanism as claimed in claim 7, characterized in that said yoke comprises an U-shaped portion secured to said journal and located on the upper end of the spider-shaped part nucleus, the branches of said portion being provided with corresponding bearings defining an articulation axis, transversal to the mast rotational axis, for said part transferring pitch to the connecting rods driving the blades.

9. A mechanism as claimed in claim 8, including a pair of bodies of symmetrical shape, having corresponding pairs of cavities faced to each other for limiting corresponding housings for linking pin bearings of the lower ends of the connecting rods engaged to the blades, said bodies having, at opposite ends, portions forming articulation axis of the piece at said bearings of the yoke branches, both bodies being provided with corresponding transversal and aligned holes made on their vertical means axis, a part linking pin being located therethrough on the lower end of the tubular mast, into which connecting rods for driving the blades extend parallel to the mast rotational axis.

10. A mechanism as claimed in claim 6, wherein said yoke freely rotates in the interior of the tubular nucleus of the spider-shaped part with said mast, for copying exactly the angle and the height of the spider part in response to the action of the cyclic and collective pitches command arms.

11. A mechanism as claimed in claim 1, wherein said third bar is linked to the bush by means of a small arm projecting perpendicularly from an intermediate point thereof, and the free end of which is crossed by a linking pin fixed to a pair of tabs forming part of the bush, the diameter of which is slightly higher than that corresponding to the first bar for allowing a longitudinal displacement of the latter and the vertical displacement of the pair of bars in response to the action of the collective pitch command arm.

12. A mechanism as claimed in claim 6, wherein said tubular nucleus of said spider-shaped part, acts as a bush for a journal of said yoke arranged with free rotatory support between a pair of end bearings of the nucleus.

13. A mechanism as claimed in claim 1, characterized in that said yoke comprises a U-shaped portion secured to said journal and located on the upper end of the spider-shaped part nucleus, the branches of said portion being provided with corresponding bearings defining an articulation axis, transversal to the mast rotational axis, for said part transferring pitch to the connecting rods driving the blades.

14. A mechanism as claimed in claim 8, including a pair of bodies of symmetrical shape, having corresponding pairs of cavities faced to each other for limiting corresponding housings for linking pin bearings of the lower ends of the connecting rods engaged to the blades, said bodies having, at opposite ends, portions forming articulation axis of the piece at said bearings of the yoke branches, both bodies being provided with corresponding transversal and aligned holes made on their vertical means axis, a part linking pin being located therethrough on the lower end of the tubular mast, into which connecting rods for driving the blades extend parallel to the mast rotational axis.

* * * * *